July 10, 1962 H. A. KLUMB ET AL 3,044,069
EXHIBITING OR CONTROL MEANS
Filed July 21, 1958 4 Sheets-Sheet 1

INVENTORS
Harvey A. Klumb
George E. Heller
BY
P. J. Young, Jr.

July 10, 1962 H. A. KLUMB ET AL 3,044,069
EXHIBITING OR CONTROL MEANS
Filed July 21, 1958 4 Sheets-Sheet 2

INVENTORS
Harvey A. Klumb
George E. Heller
BY

July 10, 1962  H. A. KLUMB ET AL  3,044,069
EXHIBITING OR CONTROL MEANS
Filed July 21, 1958  4 Sheets-Sheet 3

INVENTORS
Harvey A. Klumb
George E. Heller
BY
P. J. Young, Jr.

3,044,069
EXHIBITING OR CONTROL MEANS
Harvey A. Klumb, Pittsford, and George E. Heller, Rochester, N.Y., assignors to Taylor Instrument Companies, Rochester, N.Y., a corporation of New York
Filed July 21, 1958, Ser. No. 749,988
37 Claims. (Cl. 346—17)

This invention relates generally to the arts of recording and controlling, and in particular to exhibiting means and automatic controller combinations, and mechanisms appurtenant to said arts and to said combinations.

An automatic controller may, for the purposes of this application, be thought to be a device that measures some characteristic of a process, and, in accordance with the measurement, exerts a control effect on the process that is reflected in the said characteristic. Typical exhibiting means are recorders, indicators, alarms and other signal devices, etc.; an indicator, for example, comprising a pointer and a scale over which the pointer moves to indicate, say, the momentary value of some indicator actuating effect. A recorder, on the other hand, may be thought to be a device that produces a series of more or less permanent records of various values of some recorder-actuating effect, say, a substantially continuous graph of the fluctuations of such effect versus time.

Often, exhibiting means and a controller are combined and so related that the aforesaid characteristic of the process is not only measured by the controller but also serves directly, or indirectly, as an exhibiting means actuating effect. Since our specific illustration of the invention is mainly in terms of a so-called recorder-controller, we will naturally adhere to corresponding terminology in the description to follow, although pointing out, where need be, parallel applications of the principles of our invention to types of exhibiting means other than recorders.

Typically, great numbers of recorder-controllers are found closely packed side by side on large control panels, and considerable design effort is continuously exerted in the effort to attain structural compactness, particularly in the matter of frontal area, in order to conserve panel space. The end-result is that these elements which ought to be seen or readily available, viz. the record, certain entities concerned with control of the process, and so on, are grouped together so that when the recorder-controller is mounted in the panel, only said record and said certain entities are visible and available from the front of the panel, occupying as nearly as possible all the frontal area of panel allotted to the individual recorder-controller. The remainder of the recorder-controller is more or less lined up front to rear behind the said record and entities, with the controller itself bringing up the rear.

The resultant instrument is popularly termed a "miniature recorder-controller," in contrast to the older styles of instrument utilizing larger chart dimensions (as to frontal area, that is) and a breadboard-style of layout of the various instrument components with the result of requiring far more panel space than is now economically desirable.

While the foregoing developments do conserve panel area, in the prior art it is at the expense of separating those controller-recorder adjuncts that need to be available together into two groups divided by the panel, since some of said adjuncts are structurally incorporated in the controller proper, and hence are orphaned from their fellows, the front of the panel being the place where supervision, etc. of recorder-controller operation normally takes place. Specifically, while in front of the panel there are generally available past and present indications of the value of a process characteristic being controlled, some means to set a fixed desired value of said characteristic such that the controller will attempt to cause the said characteristic to attain and/or maintain said value, some means whereby the controller can be made ineffective in favor of so-called manual control of said process by means also at the front of the panel, perhaps some means whereby some external variable characteristic can be substituted for the said given fixed value, and so on, it is not possible to adjust the controller per se, in respect of exactly how it interprets a change of process characteristic in terms of control effect, without leaving the front of the panel. Yet if the controller is adjusted, whether or not the adjustment produces the desired results must be determined by viewing the front of the panel to see the effect of the adjustment on the record being made of the process characteristic affected by the controlling action of the controller. (Naturally, one individual could watch the front of the panel while a second individual went behind to adjust the controller, but obviously it is desirable to utilize the services of as few personnel as possible, both for reasons of economy and efficient adjustment.)

By adjustment, we refer to changing one or several of those characteristics or responses of a controller variously termed gain, sensitivity, proportional band, etc.; reset, integral, etc.; rate, derivative, Pre-Act, etc.; terms that need no explanation to those skilled in the art. In contrast to the previous list of front-of-panel adjuncts and functions, the said characteristics or responses are intimately associated with the structure of the controller, and in any prior art front-to-rear line-up of recorder-controller structure, the means for adjusting said characteristics or responses are invariably found at the back of the panel.

We believe it to be a patentably inventive, novel and useful concept, that a front-to-rear arrangement of controller and exhibiting means having the essentials of the prior art attributes described in the preceding, but in addition having controller response-adjusting means extended to the front of the panel, or rather to the front of the individual instrument, would completely and efficiently obviate the undesirability of a two-man adjusting procedure, as well as a procedure in which it is necessary to go behind the panel to adjust the controller.

It is therefore an object of our invention to provide a miniature exhibiting means and controller arrangement wherein the controller response-adjusting means may be actuated from the front of the panel in which the said arrangement is mounted.

A further object of our invention is to provide a miniature exhibiting means and controller arrangement wherein the controller response-adjusting means are actuated by means located at the front of the aforesaid panel.

It is also an object of our invention to provide a miniature recorder-controller wherein the controller response-adjusting means are located effectively behind a recorder or a part thereof, but are actuable from the front of the recorder and the panel.

Likewise, it is an object of our invention to provide a miniature indicator-controller arrangement wherein the controller response-adjusting means are located effectively behind an indicator or a part thereof, but are actuable from the front of the indicator and the panel.

In putting our inventive concept to practice, we have discovered that great advantages inhere in actually locating the controller adjusting means between recorder and controller, such that the recorder, or a part thereof, must be moved out of the way in order to get at the said adjusting means. Those advantages are:

(1) The controller response adjustments are not exposed to idle or accidental tampering, yet are accessible from the panel front.

(2) Moving the recorder to get at the adjustments can be utilized to record the time at which adjustments are made.

(3) Of the several classes of personnel who work around the control panel and participate in the various process-supervising activities there-involved, it is generally the case that not every such class is authorized to make changes in controller responses, and it is desirable to discourage use of such adjustments by unauthorized classes of personnel without resorting to the inconvenience of actually locking things up. Except in extreme cases, the facts that it is necessary to take some pains to get at the adjustments, and that such activity will leave a trace on the record chart, will acceptably minimize the occurrence of unauthorized adjustment.

Further according to the invention, we provide a novel and ingenious record chart drive mechanism, that has a part movable in order to make the controller adjustments available from the front of the panel, and we have discovered that not only is it possible to construct the mechanism so that it records the instant when the part is moved to make adjustment possible, and the instant when the part is moved to bar adjustment, it is also possible to construct the mechanism so that at all times but the said instants the record made of the process characteristic is properly synchronized with clock time. Such construction also permits the entire past history of the process characteristic to be inspected, or even removed, up to substantially the latest value being recorded, without interrupting recording.

Before embarking on an examination of a specific embodiment of our invention, it should be pointed out that it is well known that various operating energies, such as air pressure, electricity and hydraulic pressure may be utilized exclusively or in combination to drive recording and control systems analogous to the system to be described, and it is clear from the foregoing general discussion of our invention that the nature of the operating energy is incidental.

Likewise, it is also clear that while we disclose systems with a rather full complement of operational characteristics, the principles of the invention apply equally to very simple systems wherein, say, the recorder might record only whether or not a valve is open, or whether the process characteristic is out of bounds or not, and the controller would simply open or shut the valve accordingly, but could be adjusted as to how much deviation of the process characteristic is required in order to make the controller act to shut, or open, the valve. Such a simple controller would obviously be subject substantially to the same considerations of panel-space economy, ease adjustment, etc., as the more complex systems disclosed, and hence would benefit by the essence of our inventive teachings.

Having established the scope of our invention in its essentials, for relief from generality we turn now to the details of a specific embodiment of our inventive effort: a so-called air-operated controlling and recording system.

Figure 1:
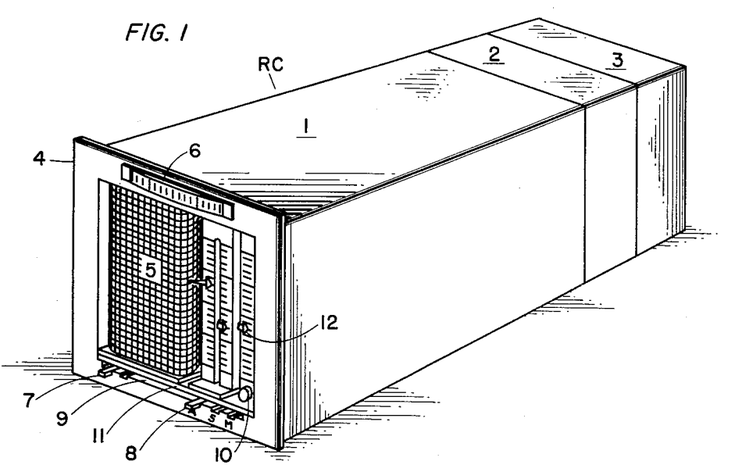
FIGURE 1 is a perspective of the frontal portion of a combined recorder-controller instrument according to the invention.
Figure 2:
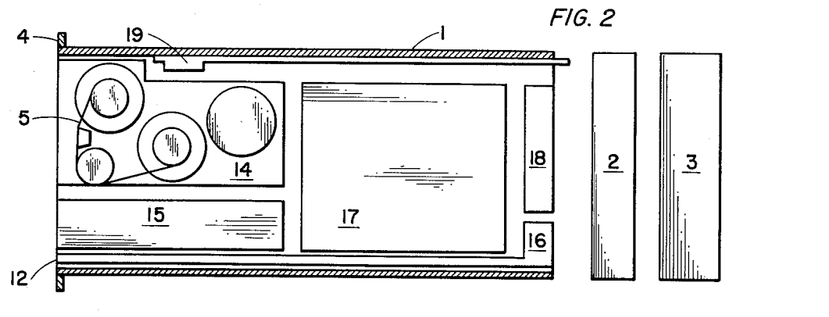
FIGURE 2 is a top view of the instrument shown in FIGURE 1, with the top of the instrument housing cut away to show a schematic layout in the horizontal plane of interior plan according to the invention, and partly exploded to indicate the relation between recorder and controller.

According to FIGURES 1 and 2, recorder-controller RC includes a main casing or housing portion 1, a manifold portion 2, a controller 3 and, at the opposite end, a sort of escutcheon 4 which frames an assembly 5 of exhibiting means including recording and indicating means. Near the top of the escutcheon is an indicator 6, and at the bottom of the escutcheon are seen operating levers 7 and 8 riding in notched slot 9, the notches being positioned to indicate desired positions of the levers. At 10 is a control knob, and the forward portion of a more or less flat base 11 is just visible, the base 11 serving to support the indicating assembly 5, except the pointer and scale device 12. As a matter of course, said manifold portion would be provided with various suitable taps (not shown) serving the manifold portion 2 with various inputs required in the operation of the recorder-controller, and supplying the various outputs of the instrument to a process control valve, and so on.

The controller 3 may be that described and claimed in the co-pending application of H. R. Jaquith, S.N. 626,537, filed December 5, 1956, entitled "Motion-Compounding Relay or Controller Device" and assigned to the assignee of our invention. Thus, controller 3 will include the contents of FIGURE 3 (but more compactly arranged) of the aforesaid Jaquith application, and plug in to manifold 2 to obtain therefrom operating air which the controller consumes in producing a control-effecting output, a set point (or cascade) air pressure to serve as a standard of reference, and a further pressure representing an actual process-characteristic, which last will cause the controller to produce an output, or a change in output, the nature of which depends on the relation between the said pressures and on how the process characteristic pressure changes.

Likewise, indicator 6 and the exhibiting assembly 5 are driven by pressures obtained from manifold 2, one such pressure being that representative of the process characteristic being controlled. Knob 10 is utilized to vary a set point pressure furnished by manifold 2 to a pressure regulating device, or equivalent in casing 1, operation of the knob 10 adjusting the said regulating device, while scale and pointer device 12 exhibits the value of set point pressure determined by the said regulating device.

Since, obviously, the present invention is not concerned with the detailed scheme of pressure piping or plumbing involved, nothing further need be said about this, other than that the manifold 2 also provides connections for supplying controller-output or a hand-regulated pressure to a valve, or like load and so on. However, it should be noted that manifold 2 does not necessarily provide controller 3 with pressure inputs independent of the mechanisms in housing 1. For example, manifold 2 actually bypasses the source of set point pressure through a set point pressure regulating device controlled by knob 10 and through valve means under control of lever 8, before such pressure is admitted to the controller 3, for the obvious purpose of diverting hand-regulated set point pressure, as established by a given setting of knob 10, directly to the said valve to be actuated, in order to permit so-called manual control of the position or condition of the valve or other ultimate load which the instrument is used to control.

As shown, the front of the instrument RC also includes a lever 7, a so-called cascade switch which in one position permits (if lever 8 is in the A or automatic notch in slot 9) the hand-regulated pressure set by knob 10 to act as set point pressure on controller 3, and in its other position substitutes in the controller some external pressure such as a variable pressure output of some exterior device instead of the said hand-regulated pressure, which pressure output is transmitted to manifold 2 and thence to a valve means in casing 1, which valve means under control of switch 8 makes the substitution.

While as to particulars, the control system, thus far briefly described, is not an essential aspect of the present invention, it exhibits a defect common to all prior art recorder-controller instruments independently of how many or how few of all possible operational adjuncts such as indicators, recording styli, automatic-manual switching, cascade switching, set point regulation, and so on, are provided in such instruments. The defect is that, although considerable pains are taken to design and arrange suitable piping, valving, and mechanism, such that to whatever extent a given instrument possesses the thus-far named operational adjuncts, the said adjuncts may be inspected and/or manipulated from the front of a panel in which such instrument is mounted (with its escutcheon more or less flush with the panel, and its bulk behind the panel), invariably adjustment of the controller itself is possible only by the manipulation of adjustment means at or in the controller structure proper that can be reached only by going to the back of the panel. Thus, in the case of the Jaquith controller, if prior art practice is followed, one would go behind the panel to operate the dial 70 on the controller body to change controller gain, and so on.

As FIGURE 1 indicates, frontal area is devoted mainly to indicating and recording functions, and irrespective of what considerations furnish the basis of a given design, the general result is that the more features such as control knobs, levers, etc., that are to occupy frontal area of the instrument, the less room there is for exhibiting devices. Any juggling of dimensions and/or numbers of exhibiting devices in order to accommodate other frontal features affects directly such essential considerations as readability, ranges, and number of characteristics that can be indicated or recorded.

In contrast to the frontal area itself, although the interior of the instrument housing is also tightly packed, there often remains room for a simple shaft or the like, as an adjusting device. Moreover, it is sometimes the case that the housing includes components not essential to control and of a lesser order of importance than the exhibiting devices on the front, and hence it will be possible to dispense with one or another of such components for the sake of the superior-order advantages of frontal adjustment.

However, quite apart from any circumstance permitting use of frontal adjustment without paying for it, so to speak, if indeed additional space must be specifically provided for frontal adjustment means, the necessary increase in instrument volume to accommodate front-available controller adjustments can have the twofold benefit of not only making room for the adjustment, but also of increasing area available for the exhibiting assembly, if the adjustments are brought forward to a point short of such assembly.

Accordingly, even should incorporation in the instrument of front-available controller response adjustments require increase in instrument volume, the expense in terms of increase in instruments size of the several advantages of such adjustments may be independently put to good use for exhibiting purposes.

We have discussed the nominally routine matter of dimensioning to a considerable extent, for the reason that such matters have developed almost to point of general standardization as to panel cut-out size, chart width, indicator proportions and scaling, and other matters pertaining to frontal area. Likewise, development in this field has substantially established a basic functional complement, namely, indication and/or recording, automatic control with adjustable set point, and so-called manual control (usually by means of the regulator or like device for establishing set point during automatic control) which establishes a corresponding complement of components. This serves as a sort of design center about which the designer must reconcile conflicting desiderata such as complexity of function, structural compactness, ease of mainteanance, and so on. Hence, the idea of rearranging the operational adjuncts of a recorder-controller must be taken to be basically repugnant to the man of ordinary skill in the art of recorder-controller design. However, as is evident from our discussion, and as will be further shown infra, the disadvantages of rearrangement are less and the advantages thereof are more, than appears at first sight.

If it is imagined that the top wall of casing 1 is cut away to expose the contents thereof to view, the various elements will be ordered in blocks somewhat as in FIGURE 2. Reference numerals 14 and 15 denote respectively a strip-chart recorder mechanism and an assemblage of scales, indicators and/or styli that as a whole make up the exhibiting assembly 5, whereas reference numeral 16 represents the set point pressure adjusting device, including pointer and scale device 12 (reference numeral 12 being used to indicate the location of such pointer and scale device, although no actual detail thereof is shown in FIGURE 2).

In the interior of the case (clearances of interior scheme exaggerated in FIGURE 2), block 17 is intended to represent the various motive devices that drive the indicator and stylus elements of assemblage 15, and adjuncts, if any, of said motive devices, such as damping devices, alarm or signal operators driven concurrently with elements of the assembly 15 and the like.

Obviously, connections between manifold 2 and the instrumentalities in casing 1 are necessary, as for example, sub-manifold 18, which may be taken as the means connecting the motive devices of assembly 17 to manifold 2. However, as long as space is left for the adjustment means 19 to reach the controller 3, the detail of the aforesaid connections, the sundry valves and plumbing involved in the functions controlled by levers 7 and 8, and so on, are immaterial for our purposes and, hence, need not be illustrated nor further described herein.

According to the invention, we have chosen to extend the controller adjustments, indicated generally by reference numeral 19, from the controller proper to a point just behind the chart assembly 14, the adjustment structure extending along a lateral boundary of the arrangement of contents, so as to minimize the difficulty of the original design problem of providing space for adjustments, while keeping frontal area within predetermined bounds.

As shown, terminating the controller adjustment device 19 just short of the chart mechanism, or of a part thereof, has the apparent disadvantage that the said mechanism or part, as the case may be, must be moved out of the way in order to get at the device 19, and seemingly inevitably affect the recording operation. Thus, if the chart mechanism is pulled out, no record is made while it is out, although the person adjusting the controller can still observe the stylus movement, or some indicator movement in assemblage 15 in order to gauge the effect of adjustment. However, the supposed disadvantage is, for reasons already pointed out, an advantage, because it is desirable that access to device 19 not be so open as to invite idle tampering or accidental operation thereof, and because of the fact that a recording hiatus is caused by gaining access to the adjustments can be put to use as information as to when adjustments were made.

In addition, we have found that by making only a part of the chart mechanism 14 movable in order to gain, or to bar, access to device 19, it is possible not only to have the record on the chart indicate the instants when the part is moved to gain access and when it is subsequently moved back to bar access, but also to have a correct recording of the history of the process variable or effect being controlled (and hence the immediate effect, if any, of the adjusting procedure) between such instants.

As for the actual mechanism for frontally adjusting the controller responses, this simply takes the form of any convenient mechanical or equivalent means for transferring adjustment motion from a frontal location to the body of the controller at the rear of the instrument casing. Typically, the thing adjusted will be some sort of variable restriction in or on the body of the controller proper, or some linkage system similarly located, the controller of the aforesaid Jaquith application having examples of both, namely, gain dial 70 and the linkage associated therewith, and rate and reset valves 43 and 42. (Reference numerals 42, 43 and 70 refer to the said Jaquith application).

Figure 3:
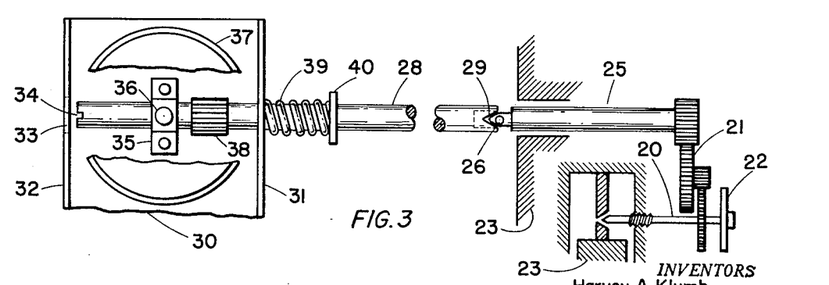
FIGURES 3 and 4 are detailed views of an adjusting device for making adjustments of the controller response from a position at the front of the recorder-controller instrument, although the structure directly affecting controller response is located at or in the controller itself.
Figure 4:
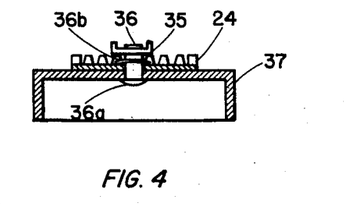
Figure 5:
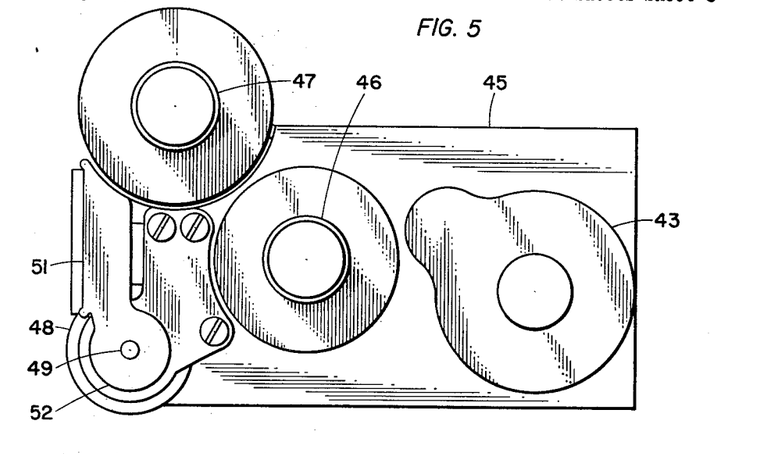
FIGURE 5 is a detailed top view of a novel strip chart drive mechanism according to the invention.

FIGURE 3 illustrates a front adjustment device suitable for the purposes described, and in this example, the thing adjusted is either a rate valve or a reset valve.

As FIGURE 3 shows, a geared means 21, the output of which is applied to dial 22, and which receives an input at the reduced or tapered end of a shaft 25 having a pin 26 passing therethrough, is built into the controller 3. As indicated by hatching 23, both shaft 25, geared means 21, and a rate or reset valve 20 operated by geared means 21 are more or less built into the body of controller 3 proper. To indicate the states of adjustment of valve 20, and hence the amount of reset or rate effect in controller response, a dial 22 fixed to the stem of valve 20 is provided calibrated in appropriate fashion and serving also to adjust valve 20, if need be.

However, for purposes of front adjustment there is provided shaft 28 having a hollow end with a notch 29 therein, so arranged that when controller 3 is mounted on the manifold 2, and the latter is mounted on casing 1, shaft 28 projects into the manifold 2 and receives the reduced or tapered end of shaft 25 such that the pin 26 is received in the notch 29. Shafts 25 and 28 being thus keyed or interfitted, may be turned as one by either shaft.

The other end of shaft 28 is supported by a bracket 35 mounted on the web of a channel member 30, the shaft passing through a suitable aperture in flange 31 of the channel member, a corresponding aperture 33 being provided in flange 32 aligned with the shaft 28 and permitting access to the slotted end 34 of shaft 28. Hence, a screwdriver, or like tool, can be applied to said slotted end 34 to turn shafts 28 and 25 and geared means 21 so as to adjust the opening of valve 20, which is shown as a simple screw-type needle valve.

As suggested by FIGURES 2 and 3, the channel member 30 is secured to a side of casing 1 with the open side of the channel facing right, looking at the instrument from the front.

A circular hollow indicator drum 37 may be rotatably secured to the bracket 35 by a rotatable mounting 36 of any desired construction. Drum 37 is cup-like, opening away from the web of channel 30, and may be calibrated on its exterior periphery in a manner corresponding to the calibration of dial 22. A ring gear 24 (not shown in FIGURE 3) is secured to the bottom of the drum, with its teeth projecting away from the open end of the drum 37, and meshing with the teeth on gear 38.

For the purpose of adjusting the angular position of the drum with respect to the angular position of shaft 28, the mechanism may be so constructed as to permit the drum to be disengaged from the gear 24, or the latter from the gear 38, whereby if shafts 28 and 25 do not interfit when dial 22 and the drum indicate like values of controller response-settings, the drum can be disengaged and the shaft 28 turned, or vice versa, until shaft 28 mates with shaft 25, with dial and drum in the proper relation. For example, the rotatable mounting 36 may be a stud fixed to the bight of bracket 35, with ring gear 24 and drum 37 rotatably supported on the stud. The stud has a head 36a and a slot (not shown) in the shank thereof, a suitable spring washer 36b being retained in said slot to press gear 24 and drum 37 just tight enough against head 36a, that it requires more torque to turn the drum relative to ring gear and rotatable mounting than would normally arise, unless it were desired to force rotation of drum 37 with shaft 28 being prevented from rotating with the drum.

Gear 38, in turn, is secured to the shaft 28, and hence if shaft 28 is turned, drum 37 will also turn, and by its angular position indicate the state of adjustment of valve 20. Obviously, the various elements involved in adjustment will be so proportioned that the indications of dial 22 and drum 37 correspond, so that if the drum 37 and dial 22 are given the same settings before attaching the controller, the setting of drum 37 will, for all practical purposes, correctly indicate the state of valve 20, when the controller is fastened to the manifold 2.

In order to assure a torque-transmitting engagement between the ends of shafts 25 and 28 in spite of the sloping sides of the notch 29 in the end of shaft 28, a spring 39 is utilized. When the instrument RC is properly assembled, spring 39 is compressed between a fixed flange or collar 40 on shaft 28 and the flange 31 of channel member 30. Hence, spring 39, which surrounds the shaft 28, thrusts the bottom of the notch 29 in the end of shaft 28 against the pin 26 of shaft 25, so that if shaft 28 is turned, a certain amount of resistance by shaft 25 to turning must occur before the pin 26 will ride up the sloping side of the notch and disengage therefrom.

Obviously, if the hollow end of shaft 28 had a slot with side walls parallel to the long axis of shaft 28, for receiving pin 26, disengagement of shafts 25 and 28 would be impossible except by pulling the controller off the manifold. However, the notch is preferred, since the amount of force that can be exerted on valve 20, and on gear means 21, is limited by the disengaging characteristic of the notch. Therefore, by varying the slope of the sides of the notch and/or the force of spring 39, it is possible to restrict the amount of torque transmitted by shaft 28 to shaft 25 to such an extent that jamming of gear means 21, complete closure of valve 20, and so on, will not result in damage to valve or gear means by attempted exertion of any given amount of torque on shaft 25, that might be considered excessive.

Moreover, the notch 29 facilitates engagement of shafts 25 and 28, since the reduced or tapered end of shaft 25, the pin and the sloping sides of the notch cooperate to guide the shaft ends into place even though said ends are misaligned angularly as the controller 3 is being moved into position on the manifold 2.

Obviously, the end of shaft 25 could be chisel-shaped, complementary to notch 29, with results similar to those obtained with use of pin 29.

In any event, if the shaft ends are misaligned, and part of the adjustment mechanism is jammed, or immovable for any other reason, slotted end 34 of shaft 28 will project somewhat forwardly of a normal position (here shown as about flush with the inner surface of flange 32), gear 38 being long enough that it can slide radially of the ring gear without disengagement therefrom. Thus, when the controller is in place on manifold 2, if the slotted end is not in its normal position, it is an indication that something is amiss, such as jamming, a foreign substance between shaft ends, controller not properly mounted, and so on.

Channel member 30 is broken away at its lower end in FIGURE 3 to indicate that it is longer than shown—long enough, say, to accommodate several drum and shaft assemblies stacked vertically. For example, note the showing in FIGURES 9 and 10 of such an arrangement in several species of the invention.

Except for the actual part of the controller adjusted by operation of the front adjustment means, and the drum-calibrations, the mechanisms involved in front adjustment will be essentially alike, hence it is unnecessary to show examples of adjusting means for each response.

Heretofore, dial 22 has served as a combined adjustment-operator and extent of adjustment indicator, one such dial being provided for each controller adjustment. It is convenient to retain this feature, since it permits both easy alignment of the indications of the front-adjusting means with the actual extent of adjustment of the needle valve or other adjustable element, as well as use of prior art adjustment practice.

As already pointed out, free access to the front adjustment means could be had merely by pulling out the recorder chart drive mechanism. However, although such mechanisms are usually arranged to be removable for maintenance purposes, and although some of the major benefits of our invention will be realized by so doing, we prefer to gain access to the front adjustment means with as little disturbance as possible in overall operation. In fact, with the recorder mechanism illustrated in FIGURES 5, 6, 7 and 8 substantially no such disturbance occurs at all.

Turning to FIGURES 5, 6, 7 and 8 a chart drive mechanism having the desired characteristics comprises drums 46, 47 and 48 mounted on parallel axes and arranged to support a strip chart 5 as in FIGURE 2, and move the same past a stylus 66, as the stylus moves transversely of the direction of chart motion in response to the fluctuations of a process characteristic. The chart drive parts are supported by a base plate 45, and include a drive drum 48, a storage drum 46 and a rewind drum 47. A motor 43 rotates drum 48 which has a circumferential row of teeth 44, thereon which interlock with the usual marginal chart perforations, and by means of which drum 48 pulls unused chart from drum 46 and passes it under and in contact with a stylus 66.

Such operation, of course, requires that the various drums be supported so as to rotate on their own axes. The shaft 49, effectively an integral part of drum 48, is rotatably supported on base 45 by any convenient means (not shown), while the drum 47 is rotatably supported on a lever 53, lever 53 in turn being supported by shaft 49 so as to be deflectible about the shaft 49 independently of the rotation of shaft 49. Stripping plate 51 is fixed at its lower end to lever 53, and may also be provided with an ear 52 at its upper end rotatably receiving the upper end of shaft 49. Hence, not only are drums 48 and 47 rotatable about their axes, but drum 47 and stripping plate 51 are also bodily deflectible on lever 53 about the axis of drum 48. By arranging the drums in this fashion, the usual recording operation briefly described supra can take place, and, in addition, certain other operations, which will be described later on in the specification.

In operation then, the chart passes from drum 46, across drum 48, where it is marked, and thence across a stripping plate 51 to rewind drum 47, also driven by motor 43, where the chart is rolled up again.

As is known, where drums 47 and 48 are driven by the same motor, it is necessary to continually, in effect, decrease the rotational speed of drum 47, since, as more and more chart is rewound on drum 47, the total amount of paper accumulated on the drum becomes greater and greater as recording proceeds. Hence, the rewind drum attempts to overrun the drive drum 48 and tearing of the chart would result, if the drum 48 were driven at a constant rate of rotation and drum 47 were unable to overrun the drive drum 48. Even if it were possible to overrun the drive drum, the time scale would then be irregular. This idiosyncrasy of the rewind drum may be compensated for by providing a slip-coupling or -clutch between drum 47 and the drive of motor 43 which will prevent the drum 47 from pulling on drum 48 via the strip chart with more than a minimum amount of chart tension at which the clutch is set to slip.

The slip coupling will be described later herein in complete detail, but for the purpose of explaining the general function of the chart drive mechanism, a brief description will suffice for the moment.

The driving clutch elements (FIGURE 8) are annuli 71 and 72, and the driven clutch element is annulus 70, which last is gripped between said annuli with a force determined by spring 73. The said driving elements turn with shaft 74 and sprocket 56, all the moving elements associated with drum 47 being rotatably supported in the last analysis by bearing post 75 which, in turn, is fixedly supported by lever 53.

In operation, should the pull of rewind drum on the chart increase to an amount just sufficient to overcome the friction between the clutch members, the clutch will slip. In practice, we arrange the drive so that slippage occurs at all times, irrespective of how much or how little chart is on drum 47, and set the spring bias on the clutch annuli to produce a sufficient rewind tension to wind up chart tightly on drum 47 without breaking the chart.

Figure 6:
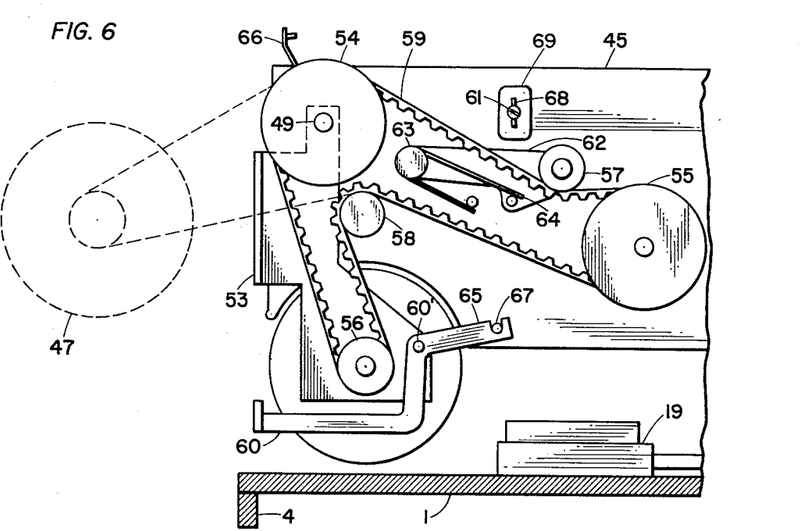
FIGURE 6 is a bottom view of the said strip chart drive mechanism, illustrating the operation thereof and the relationship thereof to the controller adjusting means, part of which is shown in the figure.
Figure 7:
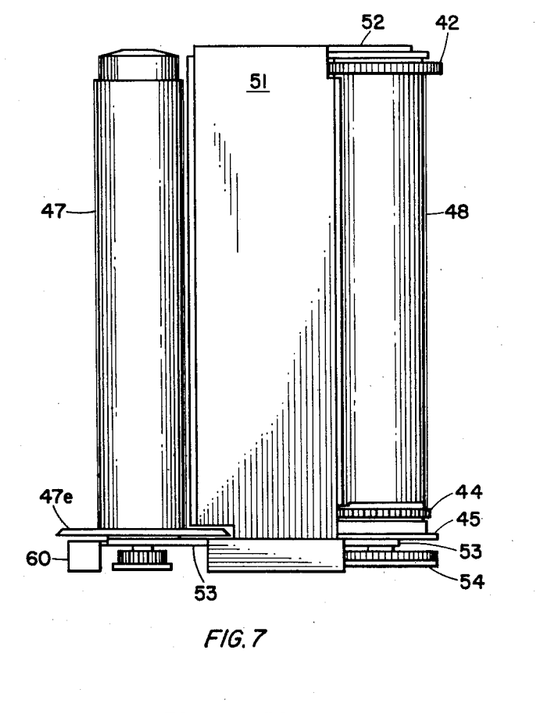
FIGURE 7 is a front elevation of the said strip chart recording mechanism.

FIGURE 6 is a bottom view of recording assembly 14. Endless toothed belt 59 meshes with notched gears or sprockets 54, 55 and 56. The relative diameters of the sprockets are proportioned so that sprocket 56 attempts to rotate drum 47 fast enough to make the clutch slip substantially continuously, irrespective of how much chart is wound up on drum 47.

Guide wheel 57, rotatably mounted on a lever 62 pivoted at one end to the base 45 at 63, and pulled in a clockwise (from the point of view of FIGURE 6) direction by a spring 64 connected to the other end of the lever, may be provided, if necessary to assure that there will be no slack in belt 59. Guide wheel 58, rotatably mounted on base 45, guides belt 59 back on itself, so to speak, after it goes around gear 56 counterclockwise during recording.

As pointed out above, to mount rewind drum 47 there is provided lever 53. At one end of said lever, drum 47 is rotatably supported, and at its other end, lever 53 is mounted so as to be pivotable about the axis of shaft 49. A slotted lever 60, pivotally mounted at 60' on lever 53, may be deflected clockwise by finger pressure at 60 to move slot 65 off pin 67, projecting from base 45, whereby the drum 47 can be pulled out (to the left, looking at FIGURE 6) as shown in dotted line, stripping plate 51 deflecting with lever 53 and drum 47, whereby adjustment device 19, part of which is shown in FIGURE 6, is exposed to view and manipulation. In practice, lever 53 will swing approximately 90 degrees, to free a space between recorder mechanism and the slide of casing 1 of the relative proportions indicated by the dotted line position of drum 47 in FIGURE 6.

The gear 55, which is driven by motor 43, could transfer motion to drum 47 via driving drum 48 by a train of gears, in which case drum 47 would be able to pivot about the axis of drum 48 without causing rotation of the driving drum 48. Hence, if the chart paper is restrained from sliding on the drum 48, which is assured by marginal perforations on the paper, and the teeth 44 on the driving drum 48 which cooperate with the perforations sprocket-wise, swinging out of drum 47 would not substantially disturb the position of the chart paper in the immediate vicinity of drum 48. This characteristic may be taken advantage of by positioning recording means adjacent a portion of the drum 48 where the paper does not move out of its normal path of movement upon deflection of drum 47 about the axis of drum 48. In FIGURE 6, a stylus 66 or like marking device, is thus positioned, and it is evident from FIGURE 6 that the drum 47 can be deflected considerably without affecting appreciably the relation between stylus and paper.

We regard this characteristic of the recording mechanism described as patentably inventive, since if the drum 47 be made deflectible about the axis of drum 48, recording is not interrupted when there is need to operate the adjustment device 19. If a gear drive is utilized, one train would be supported by plate 45 and connect sprocket 55 and sprocket 54, while a second train would be supported by lever 53 and connect sprocket 54 and sprocket 56. If lever 53 be deflected, obviously the gear of the second train meshing with sprocket 54 will simply roll about the periphery of sprocket 54, which last will continue to rotate drum 48 to drive paper past the stylus at a rate unaffected by the rolling of the last mentioned gear. In short, sprocket 54 acts as sun gear to the said second train, which train and sprocket 56 orbit as planets around sprocket 54, while rotating on their individual axes.

The foregoing planetary behaviour is closely approximated in the belt drive shown, due to the location of guide 58, sprocket 56 and the adjacent parts of the belt being the "planets" in this case.

It will be seen that the spring 64 actually tensions belt 59 slightly. Moreover, it is obvious from the geometry of the belt configuration that if the drums 47 and 48 were prevented from rotating and simultaneously drum 47 was swung out of the instrument casing, the length of belt between points of tangency on a straight line tangent to the sprockets 54 and 56 would increase, since although the straight line segment between said points would remain constant, some belt would unwrap from sprocket 54, in an amount depending on the radius of sprocket 54. Therefore, to the extent that spring 64 could exert a thrust on the belt such as to generate tension therein sufficient to overcome the intertia and bearing friction of drum 48 and pull belt across drum 48, drum 48 would rotate until the spring 64 pulled up enough slack to restore the initial belt tension, assuming, of course, that the sprocket 55 is immovable. Under these circumstances, drum 48 would back up a considerable amount, more than a quarter-turn in the arrangement shown in FIGURE 6 for a full-swing of drum 47.

Such untoward retrogression of drum 48, and hence of the chart, is neither desirable nor possible in the arrangement of FIGURE 6. As drum 47 swings out, the distance between tangent points on a straight line tangent to both sprocket 56 and guide 58 along the belt path increases, due to the fact that radius of bodily movement of drum 47 about the axis of drum 48 moves away from the axis of guide 58 and is longer than the varying radius between the axes of said guide and sprocket 56. Hence, sprocket 56 actually rotates counterclockwise (as viewed in FIGURE 6) so as to roll around the inner periphery of belt 59, chart also winding up on drum 47 at the same time, and the clutch in drum 47 absorbing any increase in tension such as might be due to the difference in the radius of sprocket 56 and the effective radius of the roll of paper on drum 47. The motor 43 rotates sprocket 55 at a more or less slow constant speed (e.g. ⅓ r.p.m.) but is effectively fixed insofar as is concerned the phenomena attendant upon swinging out the drum 47 and, therefore, no such amount of slack appears in the belt such as to reverse drum 48 an amount on the order of the angular distance of swing-out.

Instead, the general effect of swing-out is to increase the tension in belt 59, since its geometrical configuration when drum 47 is fully swung-out must obviously be greater in perimeter than when the drum 47 is fully swung-in position, in order to accommodate itself to the changed sprocket configuration. With the proportions shown, the increase in belt perimeter is quite small and is taken up mainly by forcibly spreading the ends of spring 64 so as to straighten out the belt portion directly between sprockets 54 and 55, rather than stretching of the belt. Accordingly, the motion of drum 48 will be, to all intents and purposes, absolutely unaffected by swinging drum 47 out and, accordingly, the trace made by stylus 66 has the same time relation to the chart as when the drum 47 was in its swung-in position.

It is, of course, one of the general objects of the invention that the record on the chart not become "spoiled" by disturbing the recorder mechanism in order to get at adjustment means 19. Clearly, the belt drive just disclosed substantially fulfills this particular object, and thus obviates the necessity of providing a complex and more expensive gear drive including a planetary train for permitting drum swing-out without interferring with recording. However, the swinging of drum 47 does have a slight but definite temporary effect on chart movement. The effect is, that as the rewind drum is swung-out, in the beginning some belt unwinds from guide 58, and since drive sprocket 55 moves quite slowly, a small amount of belt slack develops between guide 58 and sprocket 56, which is not immediately taken up by reason of the increasing distance between guide 58 and sprocket 56. Therefore, for a short moment, sprocket 56 does not rotate so as to roll on belt 59, and, hence, a little slack develops between sprockets 54 and 56, with the result that spring 64, sensing a diminished tension in belt 59, acts to take up the slack and thereby pulls belt across sprocket 54, and chart across drum 48, opposite to the direction sprocket 55 is driving the belt. Accordingly, drum 48 reverses and causes the strip chart to back-track under the stylus 66. The back-tracking will result in a "pip" in an already recorded stylus trace, which pip will be in the form of a kink or of a retrace, depending on whether or not the stylus was moving at the time the drum 48 reversed and presented an already-traced chart-portion to the stylus.

The retrogression of the chart is small and transient, but quite definite, and since unwrapping belt from guide 58 adds only a slight amount of slack, and the distance between guide 58 and sprocket 56 soon becomes greater than the corresponding length of slack developed between guide 58 and sprocket 56, increasing tension in belt 59 puls back the slack taken in by the action of spring 64 and accelerates the drum 48 in its normal direction of movement, so that proper relation between stylus and chart is substantially restored by the time the drum 47 is fully swung-out.

If the drum 47 is now swung-in, the above described events are repeated in reverse order, i.e., the path that must be occupied by the belt becomes shorter, hence spring 64 contracts as belt tension decreases, and drum 48 backs up. However, eventually belt begins to be wound around guide 58, fast enough to tension the belt and accelerate the drum in the direction of normal belt movement, until finally the belt as a whole is back in the configuration it possessed before the drum 47 was swung. Motor 43 has all this time been imparting motion to the belt at a constant rate, and since belt and sprockets are interlocked, the stylus and strip chart will be moving relative to one another exactly as if the recorder mechanism had not been disturbed. However, the moments at which drum 47 was swung-out and swung-in will be evidenced by kinked or retraced portions in the record.

Moreover, had adjustment means 19 been operated while the drum 47 was in swung-out position, the effects, if any, of change in controller adjustment would be accurately recorded on the chart between a pair of consecutive retraces and/or kinks caused by a swing-out and a subsequent swing-in.

Considered by itself, the belt drive hence only approximately (but quite closely) fulfills the object of permitting the recorder mechanism to be disturbed without disturbing the recording operation, while its apparent equivalent, a gear drive such as discussed previously, might fulfill such object with no appreciable deviation from the desired goal. However, the seeming imperfection of the belt drive fit is a natural ancillary of the notion of making the controller adjustments accessible, but not too accessible, for the reason that not only is idle tampering with controller adjustments discouraged, but deliberate unauthorized adjustment, too, since the act of swinging drum 48 to get at the adjustments leaves a record of its time of occurrence on the chart. Moreover, in studying the process history as recorded on the chart, the presence on the chart of kinks or retraces due to swinging drum 48 can be used to distinguish effects on the process due to adjustment, from effects on the process due to other origins.

Even in the case where there is no desire for information of the occurrence of swinging drum 47, the kinks or retraces are quite small, involving only a minute or so of chart time on a 24-hour chart of some 60 feet in length.

Due to the facts that the belt arrangement shown changes total belt length very little as the rewind drum is swung, and that the illustrated clutch and bearing structure involves very little driving force to overcome bearing friction independently of the driving force needed to slip the clutch and is smooth in operation, belt 59 hardly needs to be more than just tight enough to keep from falling off the sprockets or guides. As a results, the belt can be effectively inextensible, and have maximum service life, since it is subject to minimum internal stress.

However, the motor 43 is generally adapted to be overrun, in order to permit chart to be advanced faster than the normal rate of chart transport. For example, motor 43 may be connected to sprocket 55 by a ratchet and pawl mechanism that, while normally it serves to transfer motor output at a constant rate to the sprocket, does not prevent the sprocket 55 from being independently rotated in the same sense faster than by the motor output, which last remains unchanged though not actually driving the sprocket. Thus, the knurled flange 42 of drum 48 can be spun between the fingers to pull paper off drum 46 faster than normal and to accelerate the belt and sprocket motions to speeds higher than that imparted thereto by motor 43.

The overrunning effort tends to straighten out the belt portion directly between sprockets 54 and 55, and deflect guide 57, and this results in slack appearing in the remainder of the belt. Accordingly, an "exact fit" belt may skip on sprocket 56, or even slip off. Spring 64, being very light, is of little effect in preventing such slack from developing, and hence a stop plate 69, with a slot 68 therein, is provided, a screw 61 passing through said slot and securing plate 69 to base 45. By means of the screw 61 and slot 68, plate 69 can be positioned to prevent deflection of plate 62 in the direction of the stop plate by any desired amount. In practice, the deflection of the plate 62 in such direction, which is mainly to allow for the slight increase in belt path upon swinging drum 47 all the way out, in order to avoid stretching the belt and increasing bearing forces, is quite small, for example, a sixty-fourth of an inch would suffice in a drive mechanism of the dimensions shown.

The chart drive mechanism is in the way of being a precision mechanism operating at low energy levels, as a consequence of the need for compactness and precise operation. For example, its main task is to transport a considerable length of chart (some 60 or 70 feet to the roll) from storage drum to rewind drum at rates as low as approximately two inches a day. The chart itself may be as thin as 0.002 inch and must be handled quite carefully, so to speak, by the mechanism, to prevent inaccuracies in the record time scale established by the motion of the chart past the stylus and to prevent damage to the chart. The power available for operation is measured by the chart and the other movable elements of the mechanism. Where the drive mechanism utilizes a slip clutch, the friction involved therein, and bearing friction in general, should remain approximately constant and stable throughout a period of weeks or months of unattended use, the longer the better.

The foregoing considerations apply generally to chart drive mechanisms. However, the mechanism according to the invention, has the additional requirement of what amounts to precise undisturbed operation during a major disturbance (swinging drum 47) of the normal configuration of moving parts. The description thus far made of the chart drive mechanism indicates the manner of realizing a chart drive conforming to all the foregoing considerations. Thus, the belt drive is so arranged that the effort of driving the mechanism does not introduce any major load on the bearings involved in transferring belt motion to the drive mechanism.

However, in order to obtain a finished, practical embodiment of the drive mechanism, it is very desirable to require that the design of the rewind clutch and rewind drum be more demanding than in the case of a simpler or higher-power drive mechanism. If the clutch permits transmission of excessive torque, sufficient chart tension may be generated to cause the chart perforations to skip the teeth 44 on the drum drive, or even to break the chart, either under normal chart drive or during swing out of drum 47, where the drum 47 also exerts its rewind function due to swinging the drum out. Again, when the drum is swung in again, the chart on the rewind drum may be tightened up by turning the rewind drum by hand, say, by applying finger pressure to the chart support flange 47e. Since motor 43 is usually arranged to be overrun, if the clutch is "sticky" or too tight, manual turning of the rewind drum to tighten up the chart can overrun the motor 43, when it is not intended to overrun.

According to the invention, a novel clutch, bearing and guiding structure is provided such as not only to obviate overrunning under the circumstances indicated, but also to require a very low driving torque, the total driving torque produced by the chart drive mechanism being so much reduced that with an "exact fit" belt little more than drag of the belt teeth drives the mechanism without need for any substantial stressing of the belt to keep the belt teeth engaged with the sprockets. As a further consequence, since the belt is slack except for the offices of the weak slack take-up spring 64, the slight stress increase in the belt upon full swing out of drum 47 is not overlaid on any appreciable existing stress. This practically stress-free operation of the belt contributes immeasurably to the life of the belt. Moreover, the belt may be a substantially unstretchable loop, e.g., a cotton or like textile loop with soft rubber teeth, since its operation requires so little stretching that the slight stretchability of the threads of the loops, which run lengthwise of the belt, accommodate what little stretching is necessary, most of the slack needed in swinging drum 47 being stored substantially stresslessly by the belt configuration in the fully swung-in configuration.

The prior art has used slip-clutches of one sort or another for rewind-rate compensation purposes. However, the clutch according to the present invention, goes beyond the prior art in detail and in principle, since it incorporates the slipping effect in a different manner, such as not only to operate in greatly improved operation but with the novel result of utilizing what in prior art would be bearing friction only, also as clutch friction.

In typical prior art arrangements, the rewind drum and a driven clutch element in the form of disc are driven by a second clutch element in the form of a disc separately mounted from the first mentioned clutch element, or a simple tube serving as rewind drum may be clutched to a driving shaft concentrically mounted with said tube on a common base plate, the clutch being defined by spring fingers symmetrically arranged on the driving shaft and pressing against the inner walls of the tube, so that when the driving shaft is turned, if the resistance of the tube to the rotation of the shaft is sufficiently large, the fingers will slip.

In contrast to the prior art, we provide a slipping clutch that is quite smooth, reliable and constant in operation at low force levels and can be perfected to precise and definite structural form and function with a minimum of machining. By low force levels, we refer to situations wherein, say, a minor fraction of an ounce of force applied at the radius of the rewind drum is sufficient to cause the clutch to slip. The prior art clutches previously discussed, are rather heavy-handed, so to speak, and erratic, since clutch operation alone involves torques of several ounce-inches, or more. These unprepossessing characteristics are due to the fact that the prior art clutch, especially the spring finger clutch, tends to be insensitive when it is operating correctly, i.e., slip force will be considerable different from drive force, and in part due to the fact that the bearing friction due to rotatably supporting the drum tends to swamp out the effect that should determine slipping or clutching, to wit, change in tension of the chart paper as it comes off the driving drum.

With our novel clutch, however, the transition from slipping to holding takes place at a value of paper tension reaction in the near vicinity of the tension range in which holding changes to slipping. In a typical case, maximum paper tension is limited to one-half ounce, and as the effective radius of the drum is increased by turns of chart paper the force necessary for slipping decreases since it is applied at larger and larger radii. In fact, two ounce-inches of torque more than satisfy the driving requirements of the entire mechanism. With the described prior art arrangement, the force also decreases, but less markedly due to the greater load of bearing friction, and may even become markedly greater if the rewound chart portions are allowed drag on a stationary base, as is sometimes the practice, instead of providing the rewind drum with a bottom support for rewound chart.

The sensitivity and reliability of our novel clutch makes it worthwhile to take the trouble of providing good bearings for the rewind drum, and in so doing we have found that a seemingly elaborate bearing and guiding arrangement for drum 47 can be worked so neatly into the cultch arrangement, that the resultant essential structure is actually rather simple structurally when viewed in the light of the resultant precision and elaborateness of bearing, guiding and clutching effects. Naturally, the precision of a mechanism is no better than the precision of its parts and, therefore, of the machining required to produce the said parts, and this case is no exception. However, the machining needed is of a very simple type, and proper orientation of the machined surfaces of the assembled parts requires little more than the putting together of the parts in the manner dictated by their configurations.

Figure 8:
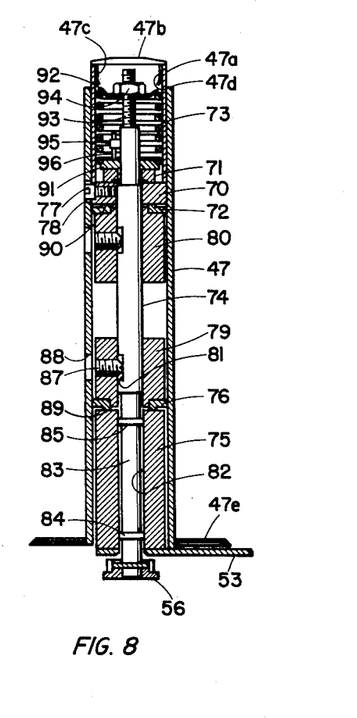
FIGURE 8 represents a chart rewind drum drawn in medial vertical section to show the details of a slip clutch and bearing support for the said drum.

FIGURE 8 shows a detailed example of the rewind drum 47 and its driving mechanism. The drum 47 itself is in the main a plain tube circular in cross-section, the upper end having fixed thereto a shorter tube section 47a of a lesser diameter than the body of the drum and telescoped inside the said body and capped by a removable cap 47b having spring fingers, 47c and 47d, or the like, to retain the cap in position. At the lower end of the drum, the body of the drum is open and surrounded by a flange or collar 47e which prevents the rewound chart paper from dragging on the lever 53 supporting the drum 47. Insofar as rotary motion is concerned, cap 47b, tube section 47a and collar 47e are integral parts of the body of drum 47. Cap 47b may be pried off to get at the interior of drum 47, if desired.

Inside the drum and, in effect, rigidly coupled thereto by a screw 77 is a combined drive and bearing ring 70, screw 77 projecting radially from the ring 70 into a vertically elongated hole 78 in drum 47. The hole 78 is elongated vertically in order to permit leeway in the vertical direction, vertically elongated flats on shaft 74, inside of collars 79 and 80, e.g., flat 81, cooperating with suitable set screws, e.g., screw 87, to permit fixing the collars at suitable heights on shaft 74, apertures such as at 88 permitting access to the set screws for the use of a suitable tool for loosening or tightening the set screws. Removal of screw 77 permits removal of drum 47 from shaft 74.

Leaving the drum, for the moment, the drive begins at sprocket 56, and is applied thereby to shaft 74, which shaft as is evident from the drawing has circular portions of different diameters. To the lever 53 is integrally fixed guide and bearing sleeve 75, having a cylindrical bore 82, through which passes reduced shaft portion 83 of shaft 74. Shaft portion 83 has secured thereto (or machined thereon) annular guide rings 84 and 85. Rings 84 and 85 ideally should fit bore 82 without play and yet turn frictionlessly in the bore 82, rings and bore, of course, serving to prevent shaft 74 (supposed to be rigid) from cocking or wobbling, and to provide a smooth bearing for rotation of the shaft by sprocket 56 and the belt or other means driving the sprocket.

Collar 79 keeps shaft 74 from vertical displacement out of a desired position, and on its lower face has a bearing and guide annulus 76 having a flat lower annular bearing surface mating at 89 with an upper flat annular bearing surface of post or sleeve 75. Hence, in vertical position, shaft 74 will be supported on the top surface of sleeve 75 by the annulus 76 fixedly secured to the shaft.

To support the drum 47 so that it can rotate relative to base 45, the support possibilities of shaft 74 are put to that use in preference to some fixed means corresponding to sleeve 75, and in addition thereto. To do this, a collar 80 is fixed to the shaft 74, which collar 80 is identical to collar 79 and bears the same relation to drum 47 and shaft 74, as does collar 79, except that collar 80 is upside down, so to speak, since the bearing annulus 72 supported by collar 80 is on top thereof, and is itself the upside down twin or equivalent of bearing annulus 76, since it has a flat annular bearing portion mating at 90 with the bottom flat annular surface of collar 70.

Thus, drum 47 is borne up by the top annular surface of collar 70, upon which collar the lower annular end surface of tube portion 47a rests, and collar 70 is borne up by annulus 72 and collar 80, and is in effect an integral part of shaft 74, of which shaft other effectively integral parts thereof, annulus 76 and collar 79, transmit the whole load of shaft, collars, annuli, drum, etc., to the fixed guide and bearing sleeve 75.

Annulus 72, collar 70 and sleeve 75 are, of course, so shaped that the several relative sliding motions involved take place in parallel planes normal to the axis of rotation of shaft 74 as defined by the bearing and guide system determined by guide rings 84 and 85 and bore 82.

In order to restrain drum 47 from lateral movements, one or more circular cylindrical guide surfaces may be provided that coact with complementary inner circular cylindrical surfaces in the body of drum 47, and in this case it is convenient to provide these guide surfaces as the outer peripheral surfaces of annuli 72 and 76. Obviously, the inner surface of drum 47 and such guide surface or surfaces should mate closely, yet with as little frictional resistance to drum rotation relative to annuli 72 and 76, as is possible.

What has been so far described is a novel and ingenious bearing and guiding system, which permits coaxial rotation of shaft 74 and drum 47, with little play, independently of each other, and with as little friction as the lubrication or slippage-permitting characteristics of the involved bearing and guide surfaces permit. In addition, the said bearing and guiding system allows the incorporation of a slip-clutch characteristic therein without any essential addition to the bearing structure (although as will be seen later on, spring 73 is provided to adjust the clutch characteristics). Broadly speaking, this result is achieved by deliberately utilizing bearing elements exhibiting a certain amount of drag, for the sake of obtaining such drag, rather than bearing elements with which it might be hoped to attain the conventional ideal of friction-free operation, as for example, bearings composed of relatively sliding elements separated by a strong film of oil, or the like, in which slippage is thought to take place. One bearing pair suitable for our purpose is unlubricated Rulon to metal, Rulon being a proprietary name for a material that can be run "dry" in bearings, or is said to be self-lubricating or oil-less, and under light loads is low in friction, the friction developed increasing as the load is increased, but smoothly (in fact, with Rulon, the coefficient of kinetic friction and the coefficient of static friction are nearly the same). Since no oil or the like is used, such bearings do not become gummed with lubricant as the lubricant ages or deteriorates.

In any event, the annuli 72 and 76 may be Rulon, while at least the top surface of sleeve 75, the surface of bore 82, the surfaces of rings 84 and 85, and the bottom and top surfaces of collar 70, should be metal. Obviously, the most critical bearing and guide means comprises rings 84 and 85 and the bore 82 of sleeve 75. Rings 84 and 85, being both at one end of the shaft 74, and subject to a thrust against the side of bore 82, must be of metal precisely machined and fitted to keep friction and cocking down to an acceptable minimum when lightly oiled.

As was remarked in the preceding paragraph, the top surface of collar 70 is metal and, also, it is flat and oriented like the bearing surface of the annulus 72. On top of the collar 70 is a Rulon annulus 71 having a lower flat bearing surface mating with that of the collar 70. The annulus 71 is fixed to an annular spring seat 91, and between the top surface of this spring seat and the bottom of another spring seat 92 is compressed spring 73. Through spring seats 91 and 92 extends an integral extension of shaft 74, which extension ends in a threaded portion 93 on which nut 94 is threaded to limit upward movement of spring seat 92. Spring seat 91 is slidable along shaft 74 but keyed so as not to rotate relative to the said extention, and, as shown, merely by way of example, the key comprises a radial finger 95 projecting from said extension. Spring seat 91 has one finger 96 projecting upward in the path of rotation of finger 95 about the axis of shaft 74. Spring seat 91 would have a second finger (not shown) like finger 96, but spaced therefrom so that finger 95 lies therebetween as between the tines of fork. Any other keying arrangement could be adopted which assures rotation of spring seat 91 with shaft 74 (and, hence, of annulus 71). Nut 94 prevents upward movements of spring seat 91, and since collar 70 is prevented from moving downward by collar 80, the compression of spring 73 causes collar 70 to be squeezed between Rulon annuli 71 and 72. This squeezing, of course, tends to bring out the clutch characteristics of the annuli, the extent depending on how much the spring 73 is compressed by nut 94.

The structure of storage or supply drum 46 may be virtually identical to that of drum 47, although normally the storage drum is not provided wtih a bottom flange such as shown at 47e on drum 47, the bottom of the unused chart roll being allowed to drag on the smooth surface of base 45. The only significant departure from identity between rewind drum and storage drum is that what in drum 46 would correspond to shaft 74, post 75, collar 79 and annulus 76 of drum 47, would be an integral assemblage of elements rigidly connected together and to base 45, since no shaft rotation relative to the base need be involved. The shaft of drum 46 being fixed, the storage drum elements corresponding to the clutch elements of drum 47 serve simply as a drag brake tightenable to an extent sufficient to keep the chart engaged with driving drum 48 and to prevent the storage drum from free wheeling as paper is pulled off of it.

The chart drive unit shown is proportioned for a four-inch chart, and the relative positions and dimensions of guide surfaces as shown in FIGURES 4, 5, 6 and 7 would be suitable guides to follow in making a drive unit of that size. However, some considerable variation in actual dimensions and relative proportions is obviously permissible.

The operation of the chart drive clutch will be clear from the foregoing description. In brief, however, the tendency for rate of rewind to increase will have no ill effects on the chart drive for the reason that drum 47 is not rigidly connected to the shaft 74, but slips for all increases in paper wind-up tension that occur as the increase in the effective diameter of drum attempts to translate the unchanging angular velocity of shaft 74 into increase in rates of paper roll-up on the drum 47. Thus, there will be no increase in tension in the paper between rewind drum and driving drum beyond a low nominal value just sufficient to take up slack in the chart and wind up the chart in a neat, compact roll on the rewind or take-up drum 47. The compensating slippage, of course, occurs between collar 70, on the one hand, and annuli 71 and 72, on the other hand. These annuli and the collar 70, therefore, combine behavior associated with bearings, on the one hand, and the behavior of clutches or brakes, on the other hand. For example, slipping takes place generally smoothly, at extremely low loads and speeds, yet the clutch can be depended on to drive the rewind drum in a regular, predictable fashion. In short, the collar and annuli coupling behaves both as a rather stiff bearing and as an easily slipped clutch.

The bearing and guiding functions being referred to the shaft 74 instead of to base plate 45, all frictional drag on the drum tending to stop it and to provide a dead load that would lower the sensitivity of the drive to paper tension is eliminated, since by having all the bearing and guiding surfaces on the drum and on the shaft 74, all the friction occurs in the drum drive, and is perceived by the rewind drum as a driving friction.

In constructing the clutch, it is obviously undesirable to utilize elements of such configuration or material that the clutch is too "slippery" or too "sticky." Insofar as we can determine, materials usable in dry surface-contact bearings are useful for this purpose, as long as the clutches made therefrom are sufficiently sensitive to loading so as to develop the slight clutching friction needed for the practice of the invention. More precisely, the clutch elements are required to slip relative to one another at speeds from one-half inch to one and one-half inches per hour with the rewind drum sprocket rotating at one and one-half times the speed of the drum drive. For best operation the static coefficient of friction exhibited between the slipping clutch elements should be as nearly equal to the kinetic coefficient of function as possible. Rulon "C" is satisfactory in this respect and a clutch utilizing that material is sufficiently stable and consistent in behavior for a reasonably long period of service without maintenance.

The material Rulon "C" is essentially copper-filled Teflon, and may be obtained from the Dickson Corp., Bristol, Rhode Island. Teflon, of course, is the trade name of a group of tetrafluoroethylene plastics. The admixture of microscopically fine copper particles with a Teflon plastic, which by itself would have a machinably-hard, leathery consistency, improves the bearing qualities of the basic material without appreciably affecting the material otherwise, insofar as our purposes are concerned. Graphitar, the trade name of a sintered compact of graphite, obtainable from U.S. Graphite Co., Saginaw, Michigan; or cloth-based Bakelite, a material of long-standing availability, might also be utilized.

In the chart mechanism according to the invention, elements, made of one or another of the foregoing or similar materials, are paired in surface contact with complementary metallic elements. The resulting pairs of elements are, of course, in the nature of "oilless" or "self-lubricating" bearings. Where loaded, as by spring 73, such bearings develop sufficient sliding friction between the dry, smoothly-finished contacting surfaces thereof to also exhibit the characteristics of an easily-slipped clutch, or of a light brake.

Although the various material pairs actually used or proposed to be used in the chart drive mechanism for clutching and/or bearing purposes seemingly may be characterized as metal to non-metal pairs, we hesitate to conclude that such is an essential characteristic of the novel clutch. The fact is that metal to metal clutches, dry or lubricated, and non-metal to non-metal clutching surfaces are also operative, but, in practice, examples of such clutches have been found to be greatly inferior because of inconsistency of behavior, short length of unattended serivce life, and so forth. Since we have disclosed a number of examples of clutch-material combinations, and the desired operational characteristics of the clutch, we believe that the scope of the claimed invention includes any clutch-material combination having the desired characteristics relative to slipping and clutching, irrespective of the materials used.

Although the foregoing illustrates what we consider the best mode of realizing our inventive concepts, other and somewhat different applications of some of the broader principles involved are possible. On the one hand, it may be desired to have substantially completely free front access to controller adjustments, without bothering with movable rewind drums or like expedients, and, on the other hand, it sometimes is the case that no recording facilities are desired, and it is still desirable and/or necessary to terminate the front adjustments in the intermediate part of the instrument housing. Hence, we illustrate in FIGURES 9 and 10 the essentials of such variants of our invention.

Figure 9:
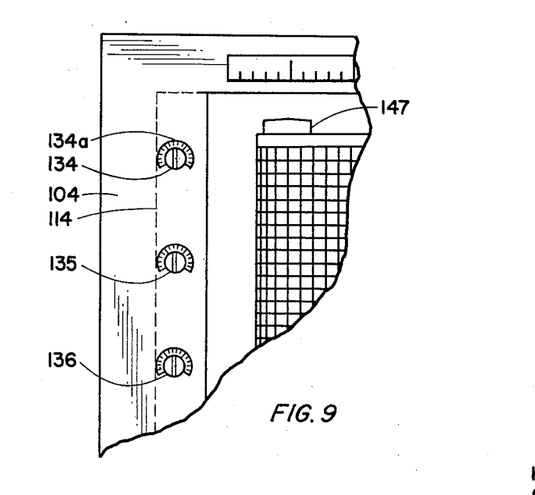
FIGURE 9 represents a more accessible arrangement of front adjustments than that illustrated in FIGURES 1 and 2.

FIGURE 9 shows fragmentarily an adjustment arrangement wherein the adjustment devices are brought completely to the front of the recorder-controller, although, except as noted below, the instrument is otherwise identical to the instrument of FIGURES 1 and 2. Slotted rod or shaft ends 134, 135 and 136 correspond to slotted rod or shaft end 34 of FIGURE 3, and, like end 34, terminate shafts like shaft 28 of FIGURE 3 for operating response-adjusting devices in the body of the controller proper (not shown in FIGURE 9).

As indicated by the dotted line 114, the escutcheon 104 differs from escutcheon 4 of FIGURE 1 in being extended as a support corresponding to channel 30, or simply as a cover, for the front-portions of the adjustment transmitting devices. If desired, scales such as shown at 134a for end 134 may be provided on escutcheon 104, against which the slots in ends 134, 135 and 136, or any other suitable indices, may be used to indicate the extent or position of adjustment.

As is evident from FIGURE 6, a certain amount of clearance between drum 47 and the adjustment shafts will be necessary in the embodiment of FIGURE 9 in order to permit space for the increase in diameter of the roll of rewinding chart as recording takes place, to wit, the distance of overhang of the flange 47e. Hence, the rewind drum 147 of FIGURE 9 may have to be located nearer the axes of drums 46 and/or 48 (not shown in FIGURE 9), which will require a reduction of width of stripping plate 51 and any other structure between drum 47 and drums 46 and/or 48, if it is desired to remove the recorder mechanism through the front of a casing having the extended escutcheon 104. Drum 147 does not need to be provided with a swingable mounting in order to permit controller adjustment, of course, but if there is some other reason for desiring to swing the drum out of the case, as, for example, to remove the drum or rewound chart, or to get at some other mechanism within the casing, the record chart transport mechanism may be identical to that of FIGURES 5–8, except for modification in proportions.

The essence of the modification shown in FIGURE 9 is simply an increase in the length of the adjustment shafts corresponding to shaft 28, and, possibly, a decrease in visible width of chart. Hence, the overall instrument otherwise substantially fully corresponds component for component, dimension for dimension, to its counterpart illustrated by FIGURES 1 to 8 inclusive, and, hence, it is unnecessary to illustrate or discuss the modification of FIGURE 9 any further.

Figure 10:
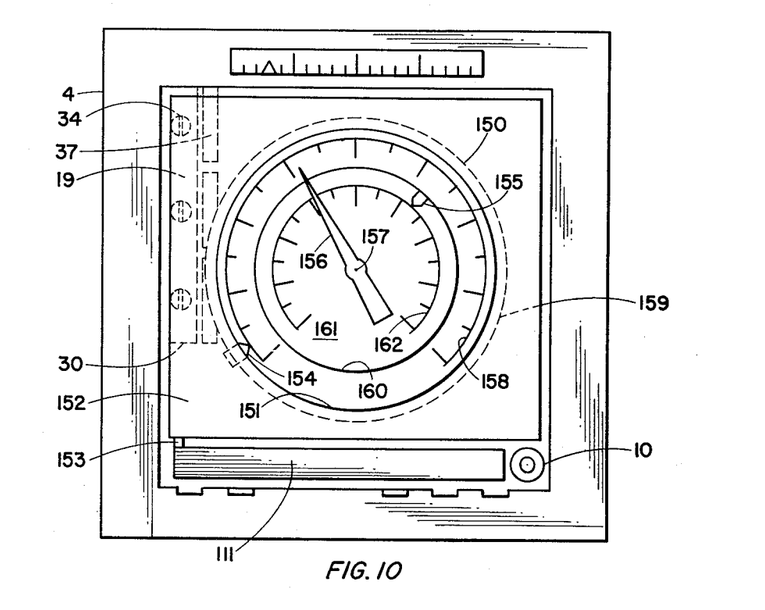
FIGURE 10 represents an arrangement of front adjustment means somewhat like that in FIGURES 1 and 2 but wherein the instrument includes no recording facilities.

FIGURE 10 shows still another application of the principles of our invention. Sometimes, no recorder is desired and instead a special indicating assembly is provided to occupy the recorder space, the instrument remaining otherwise essentially identical to its recording counterpart. In such case, an indicator assembly, generally indicated by the reference numeral 150 and in its frontal aspect taking up the area allotted in the instrument of FIGURE 1 to recorder 14 and indicating assembly 15, may be provided and located so as to be visible through an aperture 151 in a mask 152 that covers most of the area surrounded by escutcheon 4.

Mask 152 is hinged as at 153 and/or any other convenient place on base 111, which is more or less equivalent to base 11, FIGURE 1. Indicative of the essential similarity of the instruments of FIGURES 1 and 10, use in FIGURE 10 of reference numerals 4, 10, 19, 30, 34 and 37 has exactly the same significance as their use in FIGURES 1, 2 and 3.

As is indicated in dotted line, adjustment assembly 19 including channel 30 (three individual front-adjustment devices, including one such device comprising drum 37 and slotted shaft-end 34, being illustrated) is obscured when mask 152 is closed.

By way of illustration only, indicator assembly 150 includes pointers 154, 155 and 156, each pointer being pivoted on a common axis 157, pointers 155 and 156 being driven by an assembly of motive devices (not shown) equivalent to assembly 17 of FIGURE 1, and pointer 154 being utilized as a set point indicating means.

Pointers 154 and 156 play over a common scale 158 of indicia on an annular scale plate 159 having an aperture 160 through which is visible a circular scale plate 161 having a scale 162 of indicia over which pointer 155 travels, scale plate 161 being stepped back from plate 159 to provide a slot through which pointer 155 protrudes, and scale plate 159 being likewise stepped back from mask 152 to define a slot between mask and plate for pointer 154.

The above-described structure of indicating assembly 150 is typical of prior art plural indicator assemblies, and it is obvious that scale lengths, shapes, number and concomitant structure could be varied considerably and still be masked in equivalent fashion, without interfering with front adjustment of the controller.

To operate the front adjustments, it is merely necessary to swing out the mask 152 and insert a screwdriver, or the like, in one or another of the slotted ends. As shown in FIGURE 10, the hinged edge of the mask 152 is practically in front of the slotted ends of the adjustment shafts. However, if the slotted ends fall short of the front end of the casing, both hinged edges of the mask and indicator assembly can encroach on the direct frontal space between the said slotted ends and the front of the instrument as long as some space between ends and front exterior of the casing remains through which, when mask 152 is swung out, a screwdriver can be thrust at an angle to operate the adjustments, or through which a screwdriver constructed with a flexible shaft or equivalent can be passed to reach the slots in the front ends of the front adjustment shafts. Although, when the instrument of FIGURE 1 is modified to indicate only, as in FIGURE 10, the modification is taken as an opportunity to increase the area of the visual field of indication, nevertheless, there is likely to remain considerable leeway in the matter of access to the controller-response adjusting device. Hence, it is unnecessary to provide for moving any part of indicator assembly 150 in order to gain said access, although obviously the analogy with the species of FIGURES 1–8 suggests such modification.

The indicating assembly 150 may obscure to considerable extent the ability to see the indications of the adjustment settings of the controller. However, the correct adjustment finally arrived at in adjusting the controller will ordinarily be that with which the response to adjustment as indicated by the assembly 150, is satisfactory, irrespective of nominal adjustment-settings.

It will be seen that each of the disclosed variations on front adjustment includes a controller response adjusting means at the controller proper, for example, valve 20, FIGURE 3; and adjustment transmitting means, for example, shaft 28, FIGURE 3. Furthermore, it is convenient, for the purpose of certain claims, infra, to consider the adjustment transmitting means to terminate with actuating means to which the motion of adjustment is directly applied, for example, the slotted end 34 of shaft 28, FIGURE 3.

As is evident from the foregoing, we have described what we believe to be a broadly inventive concept of controller-recorder arrangements with regard to the adjustment of controller response. Moreover, realization of the aforesaid concept in terms of actual structure has resulted in a novel inventive chart mechanism, also described above, and peculiarly useful in our novel recorder-controller arrangement, possessing features of patentable utility in themselves insofar as is concerned the art of chart drive mechanisms, yet co-acting uniquely to permit the practical realization of chart drive mechanism which can be arranged to permit or exclude access to the controller-recorder instrument upon movement of a basic driven component of the said mechanism without hampering the functions of other basic components, as these latter co-act to produce precise relatively friction-free, chart-transport in spite of the disturbance in the said mechanism caused by moving the said driven component viz., the rewind drum, to permit or bar access to adjustments within the said instrument.

Having described the fruit of our inventive efforts in great detail as to principles, and their application, utility, and best mode of realization thereof, we now desire to set forth those novel aspects of our invention for which we pray the protection of the law of United States Letters Patent.

Hence, we claim:

1. In a controller and instrument casing combination, a controller of the type responsive to deviation of a process characteristic from a given relationship to a reference value of said process characteristic and having means to adjust the response of said controller to said deviation, said means to adjust the response of said controller to said deviation being located at the body proper of the controller, said casing adapted to contain a plurality of instrumentalities generally lined up front to rear relative to a front portion of said casing, the controller being mounted at the back of the casing, and the combined controller and casing being constructed to be put in service with the front of the casing easy of access, but with the back of the casing, and hence the controller, relatively difficult of access; the improvement comprising adjustment transmitting means extending from the said controller toward the said front portion of said casing and being connected to said means to adjust the response of said controller to said deviation, said transmitting means being operable to effect adjustment of said controller from the environment immediately exterior to the said front portion of said casing, to obviate the necesity of adjusting said controller from the environment immediately exterior to the said back portion of said casing, one of said instrumentalities being positioned forwardly of said adjustment transmitting means whereby normally to block access to said transmitting means from the front portion of said casing, said one of said instrumentalities being movable to a position such as to allow access to said transmitting means from the front portion of said casing when desired.

2. The invention of claim 1, including a recording mechanism in said casing and wherein the said one of said instrumentalities is a portion of said recording mechanism, said portion of said recording mechanism being movable from a position in which access to the said adjustment transmitting means is obstructed by structural elements of said recording mechanism, to a position in which said adjustment transmitting means is exteriorly accessible through the said front portion of said casing.

3. The invention of claim 1, including a strip chart recorder mechanism having a rewind drum upon which used strip chart rolls up during recording, said recorder mechanism being normally positioned so as to close off the interior of said casing relative to access from the environment immediately exterior to the said front portion of said casing, said adjustment transmitting means being substantially directly behind said rewind drum, and said rewind drum being movably mounted with respect to the remainder of said recorder mechanism so as to be movable out of said casing and away from said transmitting means, whereby said rewind drum defines said one of said instrumentalities and movement thereof as aforesaid will allow operation of said adjustment transmitting means from the environment immediately exterior to the said front portion of said casing.

4. In a recorder-controller of the in-line, strip chart variety, the first entity in line including recording means defining substantially the entire frontal area of that end of the line, the other end of the line being taken up by a controller of the type responsive to deviation of a process characteristic from a given relationship to a reference value of said process characteristic, said controller having adjustment means for adjusting the response of said controller to said deviation and said adjustment means being accessible at the controller proper and hence at the other end of the said line and therefore opposite to the recording area and inconvenient of access from the front end of the said line, especially when the controller is panel-mounted, the improvement comprising adjustment operating means located between said first entity and said controller, and adapted to operate the said adjustment means, said first entity being positioned so that an element thereof obstructs frontal access to said adjustment operating means, said element being movable to a position sufficiently removed from said adjustment operating means as to provide frontal access to the latter, whereby facility of adjustment of said controller is improved relative to the recording end of the line, yet does not require an increase in total frontal area of the first mentioned end of the line, nor allow too-easy access, nor invite tampering.

5. The invention of claim 4 wherein said element is a portion of the said recording means.

6. In combination, a strip chart recorder drive mechanism and a control device having a common support; said drive mechanism comprising: a rotatably-mounted drive drum adapted to engage a strip chart to drive said chart transverse to the axis of rotation of said drive drum, a rewind drum adapted to receive said chart as it comes off said drive drum, a movable support for said rewind drum on a first portion of which support said rewind drum is rotatably mounted, a second portion of said movable support being mounted so as to permit deflection of said first portion about the axis of rotation of said drive drum, the said drums being spaced along the direction of travel of said chart with their axes substantially parallel, whereby deflection of said support moves said rewind drum bodily in an arcuate path about the axis of rotation of said drive drum; and said control device including adjustment means for varying the characteristic behavior of said control device in the fulfillment of its control function; said mechanism and said control device being positioned on said common support with the said rewind drum barring access to said adjustment means when said drum is in one position on said arcuate path, there being another position on said arcuate path wherein said rewind drum permits access to said adjusting means when said rewind drum is in said another position.

7. In combination, a strip chart recorder drive mechanism and a control device having a common support; said drive mechanism comprising: a rotatably-mounted drive drum adapted to engage a strip chart to drive said chart transverse to the axis of rotation of said drive drum, a rewind drum adapted to receive said chart as it comes off said drive drum, a movable support for said rewind drum on a first portion of which support said rewind drum is rotatably mounted, a second portion of said movable support being mounted so as to permit deflection of said first portion about the axis of rotation of said drive drum, the said drums being spaced along the direction of travel of said chart with their axes substantially parallel, whereby deflection of said support moves said rewind drum bodily in an arcuate path about the axis of rotation of said drive drum; and said control device including adjustment means for varying the characteristic behavior of said control device in the fulfillment of its control function; said common support being a casing having front and rear end-portions, said control device being mounted at the said rear end-portion, and having its adjustment means extending into an interior portion of said casing; said drive mechanism being mounted at the said front end of said casing, and being arranged so as to substantially fill up an interior portion of said casing lying forwardly of the first mentioned interior portion when said rewind drum is in one position in its arcuate path of movement, and said casing being constructed to provide sufficient space at said front end-portion to accommodate said rewind drum in said one position, and to permit access to the said first mentioned interior portion, when said rewind drum is moved bodily to another position in its arcuate path of movement.

8. In combination, a strip chart recorder drive mechanism and a control device having a common support; said common support comprising a casing having front and rear ends, the said control device being mounted on the said rear end and having control response adjusting means extending into the interior of said casing, said drive mechanism being mounted on the front end of said casing and normally obstructing access to the interior of said casing; said drive mechanism comprising: a rotatably-mounted drive drum adapted to engage a strip chart to drive said chart transverse to the axis of rotation of said drive drum, so as to move chart past a stylus for tracing a record on said chart, a rewind drum adapted to receive said chart as it comes off said drive drum, a movable support for said rewind drum on a first portion of which movable support said rewind drum is rotatably mounted, a second portion of said movable support being mounted so as to permit deflection of said first portion about the axis of rotation of said drive drum, said drums being spaced along the direction of travel of said chart with their axes substantially parallel and normal to the plane of deflection of said movable support; a first rotatable sprocket drivingly connected to the said drive drum and having as an axis of rotation the axis of rotation of said drive drum a second rotatable sprocket mounted on the said support for said rewind drum, said second sprocket being drivingly connected to said rewind drum and having as an axis of rotation the axis of rotation of said rewind drum, a third rotably mounted sprocket adapted to be rotated by a motor, said sprockets and drums being so positioned that in access-obstructing position, chart moves from drive drum to rewind drum across the said front end of said casing, the third sprocket being mounted interiorly of the casing, with its rotation axes spaced from a plane defined by the axis of rotation of said rewind and drive drums; an endless belt enclosing all three sprockets as a whole and drivably contacting each such that if any sprocket is rotated belt will tend to be pulled across the other two sprockets, the belt part directly between said second and third sprockets being guided so as to define two portions, one of said two portions approximately parallel to the belt part directly between said first and second sprockets, and the second of said two portions approximately parallel to the belt part directly between said first and said third sprockets, whereby if the said rewind drum is bodily moved on its said support in a direction such as to permit access to the interior of the said casing only a slight change in the dimensions of the path of the belt will result, and said rewind drum will move in planetary fashion around the axis of said drive drum, whereby such bodily motion of said rewind drum occurs without substantial disturbance of chart movement from drum to drum.

9. The invention of claim 8 wherein a guide means is provided about which a belt part passes to form the said two portions, the last said belt part being located between said first sprocket and said guide means, and said belt being stressed, whereby if the said rewind drum is bodily moved to permit access to the interior of said casing, belt slack develops in the vicinity of said guide means, and said belt slack is taken up by the stress in said belt so as to rotate the said drive drum in such direction as to move chart away from said rewind drum and cause a traced chart portion to be retraced by said stylus.

10. The invention of claim 8 wherein the belt part directly between said second and third sprockets is guided around a circular guide whereby if said rewind drum is swung out of access-barring position such as to partly straighten out the guided belt part directly between said second and third sprockets, a slight amount of slack in the belt part between said circular guide and said second sprocket will initially be developed by swing out of said rewind drum, which slack will be pulled across said first sprocket by stress in said belt and, subsequently, as rewind drum swing-out proceeds, the total length of belt path will so increase as to tension the belt and pull same across said first sprocket in a direction opposite to that in which the initially-developed slack was pulled across said first sprocket, whereby if the said third sprocket is being rotated to drive said drums so as to move chart past a stylus in marking relation thereto, swinging-out said rewind drum will result in a momentary disturbance in the record being made, so as to indicate the fact that, and the time at which, said rewind drum has been moved out of control device adjustment obstructing position.

11. The invention of claim 10 wherein the said belt is substantially an exact fit without tension when said rewind drum is in access-obstructing position, and including bias means urging the belt portion directly between said first and third sprocket transverse to its path, to effectively generate in said belt a slight amount of tension sufficient to take up slack developed initially when the said rewind drum is moved from access-barring position.

12. The invention of claim 10 wherein the said second sprocket is coupled to said rewind drum by a slip clutch and said slip clutch includes one clutch element positively driven by said motion transmitting means, and a second clutch element positively connected to said rewind drum to rotate said rewind drum, said clutch elements being in frictional sliding contact with each other, whereby the torque that can be transmitted to said rewind drum by way of said clutch elements is determined by the friction between said clutch elements, said one clutch element also supporting said rewind drum, whereby the bearing friction involved in supporting said rewind drum for rotation is substantially merged with clutch friction.

13. The invention of claim 12 wherein the said one clutch element is a first flat-faced member fixed to a shaft rotated by said second sprocket and extended along the axis of rotation of said rewind drum, and the said second clutch element is a flat-faced element complementing the first mentioned flat-faced member and is fixed to said rewind drum, the flat faces of both said members being in loaded face to face contact in a plane normal to the axis of rotation of shaft so as to develop frictional resistance to sliding therebetween.

14. The invention of claim 13 wherein said rewind drum is vertically mounted and said first flat-faced member bears the weight of said rewind drum through said flat-faced element, and including a flat-ended bearing post fixed to the said movable support of said rewind drum, and a further flat-faced member fixed to said shaft, said flat-ended bearing post being in flat end to flat face contact with said further flat-faced member, said post being so arranged as to support the weight of said flat-faced element, said flat-faced members, said rewind drum, and said third sprocket on its flat-end.

15. The invention of claim 14 characterized by the use of bearing materials which incorporate the mentioned flat end and flat faces, and in contact have anti-friction characteristics when the contacts involving said end and said faces are lightly loaded by the weights of the said rewind drum and members, and including means to so load the contact between the flat faces of said first flat-faced member and said flat-faced element mentioned as to develop sufficient friction between to transmit motion from said shaft to said re-wind drum.

16. In combination, a strip chart recorder drive mechanism and a control device having a common support; said drive mechanism comprising: a rotatably mounted drive drum adapted to engage a strip chart to drive said chart transverse to the axis of rotation of said drive drum, a rewind drum adapted to receive said chart as it comes off said drive drum, a movable support for said rewind drum on a first portion of which movable support said rewind drum is rotatably mounted, a second portion of said movable support being so mounted as to permit deflection of said first portion about the axis of rotation of said drive drum, the said drums being spaced along the direction of travel of said chart with their axes substantially parallel; said drive mechanism also including means for rotating said drive drum, means for rotating said rewind drum, and motion transmitting means connected between the last two said means, said means for rotating said rewind drum and said motion transmitting means being in planetary relation to said means for rotating said drive drum, whereby said rewind drum can be bodily moved in an arcuate path of movement by deflecting said movable support but without disengaging said motion transmitting means; said common support having front and rear end-portions, said control device being mounted at the said rear end-portion, and having adjustment means extending toward the said front end-portion; said drive mechanism being mounted at the said front end-portion, and being arranged so as to substantially block access to said adjustment means when said rewind drum is in one position in the said arcuate path of movement, and to permit access to the said adjustment means, when said rewind drum is moved bodily to another position in the said arcuate path of movement.

17. In combination, a recorder, controller and casing said casing having a front end and an opposite end, the interior of said casing being relatively accessible from said front end, and said opposite end being relatively inaccessible; said controller being mounted at said opposite end and having controller response adjusting means extending into the interior of said casing; said recorder being mounted at the front end of said casing substantially obstructing access to the interior of said casing and having a rotatable strip chart rewind drum directly obstructing access to the said adjusting means, a chart drive drum adapted to be driven to feed strip chart past a stylus and to said rewind drum, a flexible loop transferring rotation of said drive drum to said rewind drum, said loop having portions extending to said rewind drum from the vicinity of the axis of rotation of said drive drum and back again from said rewind drum to the said vicinity, and a support for said rewind drum deflectible about said axis of rotation to permit said rewind drum to be moved bodily in an arcuate path away from the said adjusting means, whereby to permit access to said adjusting means without substantially disturbing the recording function.

18. The invention of claim 17, including loop driving means and a slack take-up device acting on said loop anteriorly of transfer of drive from said loop to said drive drum and after transfer of drive from said loop driving means to said loop, whereby if the rewind drum is bodily moved out by means of the said support, slack developing in said loop will be taken up by said slack take-up device and cause a motion of said drive drum differing from that imparted thereto normally by said loop so as to cause the record made by said stylus to indicate the fact that said rewind drum was moved.

19. An improved strip chart transport mechanism comprising a driving drum, said driving drum being constructed and arranged to move strip chart across said driving drum, a rewind drum constructed and arranged to wind up strip chart thereon at the same rate as strip chart is moved across said driving drum; a first support for said drums on which said driving drum is journalled, a second support for said rewind drum alone on which said rewind drum is journalled, said first support having pivot means having a pivot axis substantially coincident with the drive axis of said drive drum, said second support being mounted on said pivot means for deflection about the said drive axis of said drive drum, said rewind drum being oriented on said second support so as to be spaced from said drive drum and to have its axis of chart winding substantially parallel to the said drive axis of said drive drum, whereby to permit deflection of the said rewind drum bodily about the said drive axis of said driving drum.

20. The invention of claim 19, including a drive element in the nature of an endless flexible belt, rotary drive means for said driving drum, rotary drive means for said rewind drum, and additional rotary drive means constructed and arranged to be rotated by a motor means, said drive element being maintained in tension around all said rotary drive means and arranged to be pulled around all said rotary drive means by said additional rotary drive means so as to drive each said rotary drive means, whereby deflection of said rewind drum about said axis causes a redistribution of tension in said drive element, to produce a driving effect on said drums other than that produced by said motor means.

21. The invention of claim 20 wherein the said drive element in part passes from driving drum drive means to rewind drum drive means and thence substantially back to the driving drum drive means, and the remainder of said drive element is conducted from the rewind drum drive means to said additional rotary drive means, and from thence back to the driving drum drive means, both part and remainder of said drive element being comprised of approximately parallel straight portions joined by arcuate portions, the straight portions of said part running transverse to the straight portions of said remainder, when said rewind drum is in undeflected position, whereas when said rewind drum is in deflected position said straight portions of said part run transverse to the straight portions of said remainder to an angle more nearly straight than when said rewind drum is in said undeflected position.

22. The invention of claim 21, wherein a rotary guide is provided adjacent the driving drum drive means to constrain the said drive element to a configuration that doubles back on itself substantially symmetrically relative to a straight line from said additional rotary drive means axis to driving drum drive means axis and to a straight line from driving drum drive means axis to rewind drum drive means axis.

23. In a strip chart recorder including a chart rewind means, chart driving means for feeding strip chart to said rewind means and means for driving said chart rewind means, the arrangement being such that the chart rewind means is driven sufficiently faster than the chart driving means to produce tension in the portion of said chart being fed to said chart rewind means, the improvement comprising coupling means transferring drive from said means for driving said chart rewind means to said chart rewind means only to an extent sufficient to maintain a predetermined value of chart tension, said coupling means comprising a rotary clutch, one rotatable element of which is an effectively integral portion of said means for driving said chart rewind means, and the other rotatable element of which is an effectively integral portion of said chart rewind means, said clutch elements being arranged in rotary motion-transmitting frictional contact with each other and so as to slip relative to each other when the said tension is surpassed and to clutch together when said value of tension is not surpassed, there being loading means urging said elements together such as to maintain said elements in such contact, the said one element also being arranged as a fixed rotary bearing for said chart rewind means, and said other element being arranged as a rotary supporting bearing for said chart rewind means, whereby bearing friction involved in supporting said chart rewind means is merged in the clutch friction needed to drive said chart under said value of tension.

24. The invention of claim 23, wherein the rewind means is a rotatable hollow cylinder, the said coupling means is housed within said cylinder, and the said other element is an effectively integral part of said cylinder.

25. The invention of claim 23 wherein the said rotatable elements are of materials such that the said elements tend to slip one relative to the other against a frictional resistance proportional to the loading of the clutch elements, even when said loading is on the order of the weight of said chart rewind means.

26. The invention of claim 23, including an additional improvement in which the said means for driving said chart rewind means is a hollow body having a cylindrical bore, the axis of which is coincident with the axis of rotation of said chart rewind means, and includes rotary guide means within said bore and rotating with said effectively integral portion of said means for driving said chart rewind means, said guide means being arranged to substantially prevent the said hollow body from shifting transversely of said axis of rotation, whereby the said body is maintained in position while rotating with a minimum of friction incident to maintaining said position.

27. In combination, a rotatable drum and a rotatable drive shaft extending coaxially into said drum, said drum being rotatably borne and guided by said shaft, there being surface portions of said drum and surface portions of said shaft slidably mated together with respect to rotation of said shaft, there being bias means provided biasing the said surface portions of said drum and the said surface portions of said shaft into such slidably mated condition, said bias means being arranged to create sufficient frictional drag between said surfaces to permit transfer of rotation of said shaft to said drum when the resistance to rotation of said drum is at one minimal value, but to permit slippage between drum and shaft when the resistance of said drum to rotation is of a higher value than said minimal value.

28. The invention of claim 27, wherein the said portions have mating contact surfaces of metal and non-metal such that the said friction is developed between metal and non-metal, whereby the said surfaces are capable of performing both the function of clutch contact surfaces and the function of bearing contact surfaces.

29. The invention of claim 28, wherein the non-metal is essentially a metal-filled plastic substance.

30. The invention of claim 28, wherein the non-metal is essentially a copper-filled tetrafluoroethylene plastic.

31. A cylindrical drum adapted to reel material of indefinite length thereon at a constant linear rate so as to build up the effective radius of the drum, a rotatable drive member for said drum having parts frictionally contacting portions of said drum, the said portions and parts being so arranged as to slide relative to one another in circular paths, so that if the drum is fed material at constant rate and the drive member is driven at a rate sufficiently great to turn the drum faster than necessary to reel the material in the absence of slippage, the said portion and said parts slip relative to one another; there being bias means forcing said portions into engagement with said parts and said drive member being rotatably supported in an otherwise fixed position with the axis of rotation; said parts and said portions being so oriented with respect to each other, that said bias means comprises the weight of said drum and the material thereon, when the axis of said circular paths is transverse to the horizontal.

32. The combination of a shaft and a hollow member, wherein the said shaft guides, bears and clutches the said hollow member, guide means on said shaft having a circular guide surface circumscribing the said shaft and normal to radii of rotation thereof, there being a surface in the interior of said member mating in guiding relation with the said guide surface, clutch means comprising a part on said shaft having a plane surface normal to the axis of rotation of said shaft and a part of said hollow member having a plane surface in contact with the first mentioned plane surface, said clutch means being adapted to slip in operation, and a bearing supporting said shaft for rotation thereof, whereby the various mentioned surfaces of elements on said shaft serving as the sole means of guiding and bearing the said hollow member.

33. A strip chart transport mechanism including a rewind drum, a shaft supported for rotation coaxially of the said rewind drum, and a slip clutch for transmitting rotation of said shaft to said drum, said slip clutch comprising a pair of annular members having facing parallel flat surfaces and coaxially mounted on said shaft, one of said annular members being in effect an integral part of said shaft, and the other of said annular members being movable axially of said shaft, a collar having flat opposite faces parallel to the said surfaces and mounted coaxially of said shaft, but free to rotate thereon, said collar being between said annular members, means on said shaft adapted to bias the said other of said annular members toward the said one of said annular members with predeterminable force so as to grip the said collar between said annular members, said collar being effectively a part of said rewind drum, whereby rotation of said shaft will be transmitted to said rewind drum to the extent that frictional resistance between said collar and said annular members is sufficient to cause movement of said rewind drum in the face of a predetermined value of torque due to resistance of said rewind drum to being moved.

34. The invention of claim 33 wherein the said drum is arranged to be supported on said shaft by said annular members and said annulus, and including guide means fixed on said shaft and inside said drum, said guide means being arranged on said shaft to prevent cocking of said drum relative to said shaft.

35. In combination, an exhibiting device and a controller, said exhibiting device having a front portion whereon is exhibited information relevant to a system including said controller and a process controlled by said controller in response to deviation of said process from a desired state of said process, said exhibiting device having a back-portion, said controller being mounted on said back-portion and having means for adjusting the response of said controller to said deviation, said means being located forwardly of said back-portion and accessible from the vicinity of the said front portion; said exhibiting device including a recording means, said recording means normally obstructing access to said means for adjusting the response of said controller to said deviation, there being a part, at least, of said recording means located in front of said means for adjusting the response of said controller to said deviation, and said part being of sufficient structural extent to obstruct frontal access to said means for adjusting the response of said controller, said part being movable out of such location to a position such as to permit frontal access to the said means for adjusting the response of said controller to said deviation.

36. In a controller and instrument casing combination, a controller of the type responsive to deviation of a process characteristic from a given relationship to a reference value of said process characteristic and having means to adjust the response of said controller to said deviation, said means to adjust the response of said controller to said deviation being located at the body proper of the controller, said casing being adapted to contain a plurality of instrumentalities generally lined up front to rear relative to a front portion of said casing, and the combined controller and casing being constructed to be put into service with the front of the casing easy of access, but with the back of the casing, and hence the controller, relatively difficult of access, said casing including a wall enclosing and generally closely adjacent to said instrumentalities, there being an opening in said wall closely surrounding the frontmost of said instrumentalities; and the said frontmost of said instrumentalities being an exhibiting device located in the front portion of said casing, and presenting thereat information visible through said opening from the environment immediately exterior to the said front portion of said casing, said information relating to said response of said controller; the improvement comprising adjustment transmitting means extending from said controller toward the said front portion of said casing and being connected to said means to adjust the response of said controller to said deviation, said transmitting means having actuating means positioned in said casing, and adjacent said opening, and between said exhibiting device and said wall; said opening providing access to said actuating means and to said exhibiting device, for effecting adjustment of said controller from the environment immediately exterior to said front portion of said casing.

37. In a controller and instrument casing combination, a controller of the type responsive to deviation of a process characteristic from a given relationship to a reference value of said process characteristic and having means to adjust the response of said controller to said deviation, said means to adjust the response of said controller to said deviation being located at the body proper of the controller, said casing being adapted to contain a plurality of instrumentalities generally lined up front to rear relative to a front portion of said casing, and the combined controller and casing being constructed to be put into service with the front of the casing easy of access, but with the back of the casing, and hence the controller, relatively difficult of access, said casing including a wall enclosing and generally closely adjacent to said instrumentalities, there being an opening in said wall closely surrounding the frontmost of said instrumentalities; and the said frontmost of said instrumentalities being an exhibiting device located in the front portion of said casing, and presenting thereat information visible through said opening from the environment immediately exterior to the said front portion of said casing, said information relating to said response of said controller; the improvement comprising adjustment transmitting means extending from said controller toward the said front portion of said casing and being connected to said means to adjust the response of said controller to said deviation, said transmitting means having actuating means positioned in said casing, and adjacent said opening, and between said exhibiting device and said wall; said opening providing access to said actuating means and to said exhibiting device, for effecting adjustment of said controller from the environment immediately exterior to said front portion of said casing; and access-obstructing means positioned in said casing and forwardly of said actuating means, and proportioned when so positioned to obstruct access to said actuating means while permitting access to said exhibiting device from the front portion of said casing, said access-obstructing means being movable to a position such as to allow access to said actuating means from the front portion of said casing when desired.

References Cited in the file of this patent
UNITED STATES PATENTS

| | | |
|---|---|---|
| 2,401,982 | Springhorn | June 11, 1946 |
| 2,594,136 | DiMaggio | Apr. 22, 1952 |
| 2,618,528 | Cladwell | Nov. 18, 1952 |
| 2,671,710 | Bowditch | Mar. 9, 1954 |
| 2,686,013 | Christian | Aug. 10, 1954 |
| 2,729,079 | Kuehn | Jan. 3, 1956 |
| 2,796,317 | Valenti et al. | June 18, 1957 |
| 2,805,113 | Brown et al. | Sept. 3, 1957 |
| 2,852,197 | Virbila | Sept. 16, 1958 |
| 2,857,750 | Fox | Oct. 28, 1958 |
| 2,903,321 | Maude | Sept. 8, 1959 |

OTHER REFERENCES

Rider Television Manual—Vol. 2, Zenith TV page 2–2. Copyright 1949.